United States Patent [19]
Taylor

[11] 3,944,511
[45] Mar. 16, 1976

[54] CHEMICALLY MODIFIED POLYMERS
[75] Inventor: Lynn J. Taylor, Haslett, Mich.
[73] Assignee: Owens-Illinois, Inc., Toledo, Ohio
[22] Filed: Aug. 23, 1971
[21] Appl. No.: 174,196

[52] U.S. Cl. ........ 260/23 H; 204/158 R; 204/162 R; 260/27 EV; 260/27 R; 260/33.6 R; 427/407; 427/417; 427/385
[51] Int. Cl.² .......................................... C08L 91/00
[58] Field of Search .......... 260/23 H, 27 EV, 27 R, 260/33.6 R; 117/126 R, 124 E, 94.9 G; 204/158 R, 162 R

[56] References Cited
UNITED STATES PATENTS

| | | | |
|---|---|---|---|
| 2,455,910 | 12/1948 | Anderson | 260/23 H |
| 3,188,165 | 6/1965 | Magat | 8/115.5 |
| 3,386,936 | 6/1968 | Gordy et al. | 260/23 H |
| 3,476,698 | 11/1969 | Dsterrieth | 260/23 H |
| 3,515,687 | 6/1970 | Leistner | 260/2 |
| 3,549,572 | 12/1970 | Minagawa | 260/23 H |
| 3,549,587 | 12/1970 | Nicholson et al. | 260/23 H |
| 3,657,171 | 4/1972 | White | 260/27 EV |

FOREIGN PATENTS OR APPLICATIONS

| | | | |
|---|---|---|---|
| 721,439 | 11/1965 | Canada | 260/27 EV |

*Primary Examiner*—M. J. Welsh
*Assistant Examiner*—William E. Parker
*Attorney, Agent, or Firm*—Donald Keith Wedding

[57] ABSTRACT

There is disclosed a process for preparing chemically modified polyolefins or copolymers thereof which comprises reacting an olefin polymer with a co-reactant having a structure containing both a hydrocarbon residue and at least one highly polar functional group, said reaction being conducted in the presence of a source capable of generating free radicals in the presence of heat, light, oxygen, ionizing radiation, etc.

33 Claims, No Drawings

CHEMICALLY MODIFIED POLYMERS

THE INVENTION

This invention relates to the preparation of novel polymeric materials by the chemical modification of polyolefins, olefin copolymers, and other polymeric materials with a structure containing saturated aliphatic carbon atoms. The resulting modified polymers are highly suitable for use in coating, adhesive, and packaging applications.

More particularly, this invention relates to the chemical combination of a polyolefin polymer or copolymer with one or more non-polymeric organic compounds having the generalized structure R–X, where R is a linear, branched, or cyclic aliphatic hydrocarbon residue containing at least six carbon atoms, and X is a polar functional group which is a member of the series comprising the following groups:

hydroxyl (—OH);
carboxyl (—COOH);
amide (—CONH$_2$);
mono- or disubstituted amide
(—CONHR$_1$ or —CONR$_1$R$_2$), where the substituents R$_1$ and R$_2$ are the same or different lower alkyls containing one to four carbons;
amino (—NH$_2$);
mono- or disubstituted amino
(—NHR$_1$ or —NR$_1$R$_2$), where the substituents R$_1$ and R$_2$ are the same or different lower alkyls containing one to four carbons;
trialkoxysilyl

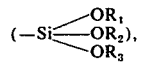

where the substituents R$_1$, R$_2$, and R$_3$ are lower alkyls containg one to four carbon atoms;
sulfonic acid (—SO$_3$H);
hydrogen sulfate (—OSO$_3$H);
and
dihydrogen phosphate (—OPO$_3$H$_2$).

The group X may also bear one or more units of positive or negative charge, as in the case of the following groups:
carboxylate (—COO$^-$);
sulfonate (—SO$_3^-$);
singly charged sulfate (—OSO$_3^-$);
singly or doubly charged phosphate (—OPO$_3$H$^-$ or —OPO$_3^=$);
ammonium (—NR$^+_1$R$_2$R$_3$); where the substituents R$_1$, R$_2$ and R$_3$ are hydrogens or lower alkyls containing one to six carbons;
sulfonium (—SR$_1^+$R$_2$), where the substituents R$_1$ and R$_2$ are the same or different lower alkyls containing one to six carbons;
and
phosphonium (—PR$_1^+$R$_2$R$_3$), where the substituents R$_1$, R$_2$ and R$_3$ are the same or different lower alkyls containing one to six carbon atoms.

In the case of such charged groups, it should be understood that an ion of opposite charge is simultaneously present, such as a sodium ion in the case of a carboxylate or sulfonate group, and a halide ion in the case of an ammonium, sulfonium, or phosphonium group.

It is further contemplated that the co-reactant R–X may contain aromatic or heterocyclic rings as a part of the structure of R, in addition to the essential aliphatic hydrocarbon group or groups. Furthermore, it should be understood that more than one group of type R, and/or more than one group of type X, may be present per molecule of co-reactant R–X.

It is further contemplated that an anhydride or imide having a long-chain alkyl or alkenyl substituent, such as dodecenylsuccinic anhydride or the corresponding imide, may be used as the R–X co-reactant.

Compounds of the type R–X as described hereinbefore, particularly those having a single group of type R and a single group of type X, are commonly referred to as "surfactants" owing to their surface-active properties.

This invention consists of effecting the chemical combination of the polymeric polyolefin reactant and the nonpolymeric co-reactant (R–X) by subjecting a mixture of these two materials, optionally in the presence of additional ingredients, to conditions so as to promote the formation of reactive free radicals. Under such conditions, free radicals derived from the polymer and other free radicals derived from the non-polymeric co-reactant, are both formed; chemical bonding between the polymer and the co-reactant occurs as a result of radical-radical combination processes.

The formation of crosslinked polymers by processes involving the formation and interaction of free-radical intermediates is known in the prior art. In such processes, a crosslink between polymer chains is formed as a result of the combination of polymeric radicals. Typically, this is accomplished by heating a mixture of a polymer and an organic peroxide to a temperature at which the peroxide decomposes to free radicals.

The formation of graft copolymers by free-radical processes is also known in the prior art. In such processes, a polymeric radical is formed, and undergoes an addition reaction with the reactive carbon-carbon double bond of a vinyl monomer, such as styrene or methyl methacrylate; the resulting radical then adds further units of vinyl monomer by successive radical addition reactions. Typically, such a graft copolymerization is accomplished by heating a mixture of a polymer, a vinyl monomer, and an organic peroxide to a temperature at which the peroxide decomposes to yield free radicals.

Likewise, the preparation of physical blends of polymers with certain types of non-polymeric additives of the type R–X is known in the prior art. Typically, such additives are employed so as to confer anti-static properties or to aid in the dispersion of particulate materials in polymers or polymer solutions.

In the practice of the present invention a wide variety of reaction conditions may be employed in order to promote the formation of free radicals. In particular, heat, light, oxygen, free-radical initiating reagents, ionizing radiation, etc., individually or in combination, may be employed.

In one preferred embodiment of this invention, a mixture of a polyolefin or olefin copolymer, a fatty acid, and an organic peroxide is heated to a temperature sufficient to cause thermal decomposition of the peroxide.

In the case of such preferred embodiment, examples of the polymeric reactant, fatty acid, and peroxide are given hereinafter.

Examples of polymeric reactants include:

polyethylene;
polypropylene;
poly(1-butene);
poly(4-methyl-1-pentene);
ethylene-propylene copolymers;
ethylene-1-butene copolymers;
ethylene-1-hexene copolymers;
ethylene-vinyl acetate copolymers;
ethylene-ethyl acrylate copolymers;
and
ethylene-acrylic acid copolymers.
Examples of fatty acids include:
capric acid;
lauric acid;
stearic acid;
palmitic acid;
myristic acid;
arachidic acid;
behenic acid;
oleic acid;
linoleic acid;
linolenic acid;
eleostearic acid;
ricinoleic acid;
erucic acid;
elaidic acid;
and
arachidonic acid.

Examples of peroxides include: acetyl peroxide; benzoyl peroxide; p-chlorobenzoyl peroxide; 2,4-dichlorobenzoyl peroxide; ditoluoyl peroxide; decanoyl peroxide; lauroyl peroxide; isobutyryl peroxide; diisononanoyl peroxide; pelargonyl peroxide, tert-butyl peroxyacetate; tert-butyl peroxymaleic acid; tert-butyl peroxyisobutyrate; tert-butyl peroxypivalate; tert-butyl peroxybenzoate; tert-butyl peroxycrotonate; tert-butyl peroxy-(2-ethylhexanoate); 2,5-dimethyl-2,5-bis-(2-ethylhexanoylperoxy)hexane; 2,5-dimethyl-2,5-bis-(benzoylperoxy)hexane; 2,5-dimethyl-2,5-bis-(tert-butylperoxy) hexane; 2,5-dimethyl-2,5-bis-(tert-butyl-peroxy)-hexyne-3; di-tert-butyl diperoxyphthalate; 1,1,3,3-tetramethylbutylperoxy-2-ethyl-hexanoate; di-tert-butyl peroxide; di-tert-amyl peroxide; tert-amyl-tert-butyl peroxide; 1,1-di-tert-butylperoxy-3,3,5-trimethyl cyclohexane; bis-(tert-butylperoxy)-diisopropylbenzene; n-butyl-4,4-bis-(tert-butylperoxy)valerate; dicumyl peroxide; acetyl acetone peroxide; methyl ethyl ketone peroxide; cyclohexanone peroxide; tert-butylperoxy isopropyl carbonate; 2,2-bis-(tert-butyl-peroxy)butane; di-(2-ethylhexyl)peroxydicarbonate; and bis-(4-tert-butylcyclohexyl)peroxydicarbonate.

In a second specific embodiment hereof, a mixture of an olefin polymer or copolymer, an organic peroxide, and a long-chain alcohol, amine, or amine oxide is heated to a temperature sufficient to cause thermal decomposition of the peroxide. Suitable polymeric reactants and peroxides would include those mentioned in the case of the first embodiment. Suitable co-reactants would include alcohols such as lauryl alcohol, stearyl alcohol, cetyl alcohol, and oleyl alcohol; amines such as lauryl dimethyl amine, stearyl dimethyl amine, and stearyl amine; and amine oxides such as lauryl dimethyl amine oxide, stearyl dimethyl amine oxide, and cetyl dimethyl amine oxide.

In a third specific embodiment, a mixture of an olefin polymer or copolymer, an organic peroxide, and a nonionic, cationic, or anionic surfactant is heated to a temperature sufficient to cause thermal decomposition of the peroxide. Suitable polymeric reactants and peroxides would include those mentioned in the case of the first embodiment. Surfactants suitable for use as coreactants are given hereinafter. Examples of nonionic surfactants include:
nonyl phenol-ethylene oxide condensation products;
octyl phenol-ethylene oxide condensation products;
mono and di glycerides, e.g. monostearin, distearin, monoolein, diolein; and
polyethylene glycol and derivatives, including fatty acid esters (mono and di).
Examples of cationic surfactants include:
lauryl trimethyl ammonium chloride;
lauryl pyridinium chloride;
cetyl trimethyl ammonium bromide;
cetyl pyridinium bromide;
cetyl pyridinium chloride;
cetyl dimethyl benzyl ammonium chloride;
stearyl dimethyl benzyl ammonium chloride;
and
dilauryldimethyl ammonium bromide.
Examples of anionic surfactants include:
sodium laurate;
sodium stearate;
sodium oleate;
sodium lauryl sulfate;
sodium dioctyl sulfosuccinate;
sodium dinonyl sulfosuccinate;
sodium dodecylbenzenesulfonate;
and
lauryl acid phosphate.

In a fourth specific embodiment, a mixture of an olefin polymer or copolymer, an organic peroxide, and a rosin acid or salt thereof, or an aliphatic dicarboxylic or tricarboxylic acid, or salt thereof, is heated to a temperature sufficient to cause thermal decomposition of the peroxide. Suitable polymeric reactants and peroxides would include those mentioned in the case of the first specific embodiment. Suitable carboxyl-containing co-reactants and salts include rosin acids and salts such as abietic acid, levopimaric acid, calcium resinate, barium resinate, and sodium resinate; dicarboxylic acids and salts such as dimer acid, sebacic acid, azelaic acid, and sodium sebacate; and tricarboxylic acids such as trimer acid.

In a fifth specific embodiment, a mixture of an olefin polymer or copolymer, an organic peroxide, and a fatty acid amide is heated to a temperature sufficient to cause thermal decomposition of the peroxide. Suitable polymeric reactants and peroxides would include those mentioned in the case of the first specific embodiment.
Suitable fatty acid amides include:
oleamide;
erucamide;
oleic acid diethanolamide;
lauric acid diethanolamide;
stearic acid diethanolamide;
lauric acid N,N-dimethyl amide;
and
stearic acid N,N-dimethyl amide.

In any or all of the preceding embodiments, a mixture of two or more co-reactants of type R–X may be utilized in place of a single compound.

In any or all of the preceding embodiments, the organic peroxide may be replaced by another reagent, or combination of reagents, capable of generating free radicals under appropriate conditions. Such reagents would include the following:

HYDROPEROXIDES tert-Butyl hydroperoxide
Cumene hydroperoxide
Diisopropylbenzene hydroperoxide
2,5-Dimethylhexane-2,5-dihydroperoxide
p-Menthane hydroperoxide
1,1,3,3-Tetramethylbutyl hydroperoxide.

METALLO-ORGANIC REAGENTS USED ALONE OR IN COMBINATION WITH HYDROPEROXIDES:

Cobalt 2-ethylhexanoate
Cobalt naphthenate
Cobalt tallate
Copper naphthenate
Copper phthalocyanine
Copper acetylacetonate
Ferric acetylacetonate
Ferrous acetylacetonate
Ferrous stearate
Iron neodecanoate
Iron tallate
Manganese naphthenate
Manganese tallate.

AZO COMPOUNDS

2-Azobis-(isobutyronitrile)
2-Azobis-(propionitrile)
Dimethyl-2-azobisisobutyrate
1-Azobis-(1-cyclohexanecarbonitrile)
2-Azobis-(2-methylheptanitrile)
2-Azobis-(2-methylbutyronitrile)
4-Azobis-(4-cyanopentanoic acid)
Azodicarbonamide

QUINONE OXIMES, ETC.

p-Quinone dioxime
p-Dibenzoylquinone dioxime
2,6-Dichloroquinone chlorimide.

SULFUR COMPOUNDS

Benzothiazyl disulfide
Dibenzyl disulfide
Dixylyl disulfide (various isomers)
2-(Morpholinothio)benzothiazole
Dibenzoyl disulfide
Tetramethylthiuram disulfide
Diphenyl disulfide
Di-p-tolyl disulfide
Tetramethylthiuram monosulfide

BIBENZYLS $\alpha,\alpha'$-Dimethoxy-$\alpha,\alpha'$-diphenylbibenzyl
$\alpha,\alpha'$-Diphenyl-$\alpha$-methoxybibenzyl
$\alpha,\alpha'$-Dimethoxy-$\alpha,\alpha'$-dimethylbibenzyl
$\alpha,\alpha'$-Dimethoxybibenzyl Any or all of the previously described specific embodiments may also be carried out by omitting the organic peroxide and carrying out the reaction under conditions which lead to the formation of free radicals via partial thermal or oxidative decomposition of the polymer and/or the co-reactant. Furthermore, a third reactant which readily forms free radicals on exposure to oxygen, such as an olefin, ether, or thiol, may be used.

In the practice of this invention, it is contemplated that the reactive composition will ordinarily contain about 60 to 98% by weight of polymer, about 1 to 30% by weight of coreactant, and about 1 to 20% by weight of a radical initiator or combination of initiators.

Additional materials, such as fillers, pigments, dyes, plasticizers, foaming agents, reinforcing agents, etc., may also be present during the reaction, or may be added subsequently. It should be understood that such additives are not to be considered in calculating the percentages of polymer, co-reactant, and initiator, as specified above.

In the practice of this invention, the reaction may be conducted in a conventional vessel, such as a chemical reactor, and the polymeric product may subsequently be fabricated by conventional means, such as molding, extrusion, calendaring, solution casting, etc.

Alternatively, the reactive composition may be prepared and fabricated as a film, coating, adhesive, three-dimensional article, etc., and the chemical reaction conducted subsequently, in situ, by heating, exposure to oxygen, etc.

The following examples represent some of the best embodiments contemplated by the inventor.

EXAMPLE I

A solution of 30 grams (g.) polyethylene (Marlex TR 880), 6 g. stearic acid, and 3 g. dicumyl peroxide in ca. 550 milliliters (ml.) hot xylene was prepared. Coatings on glass substrates were prepared by casting portions of the solution onto warmed microscope slides. After drying, the coatings were heated overnight at 135°C. in a vacuum oven.

The "cured" coatings showed good adhesion to glass. When such a coating (thickness 9 mils) was removed and subjected to continuous extraction (Soxhlet apparatus) with refluxing n-butanol for 24 hrs., examination of the infrared spectrum revealed that the carboxyl-containing material (derived from stearic acid) had not been removed by extraction. When a physical mixture of polyethylene and stearic acid, without peroxide, was prepared and treated similarly, the stearic acid was removed by butanol extraction.

EXAMPLE II

A solution of 20 g. polyethylene (Marlex TR 880), 4 g. stearic acid, and 2 g. dicumyl peroxide in 400 ml. hot xylene was prepared. Films were obtained by casting the resulting solution onto heated glass microscope slides. When such a film was "sandwiched" between two glass slides and the combination heated four hours at 145°C., a strong adhesive joint was formed.

EXAMPLE III

A solution of 8 g. polyethylene (Microthene FN 500), 2 g. oleic acid, and 2 g. 2,5-dimethyl-2,5-bis(t-butylperoxy)-hexyne-3 in 80 ml. warm xylene was prepared, and fabricated into coatings by casting onto warmed glass microscope slides with the aid of a fixed-clearance applicator. When such a coating was cured by heating 1 hr. at 170°C., the resulting coating showed good adhesion to glass (as judged by an adhesive-tape test); a sessile drop of distilled water formed a contact angle of 69° on the cured coating. An additive-free polyethylene film, prepared and treated in the same manner, failed the adhesion test and had a water contact angle of 89°.

EXAMPLE IV

A series of coatings, each prepared from 8.0 g. polyethylene (Microthene FN 510) 2.0 g. 2,5-dimethyl-2,5- bis-(t-butylperoxy)hexyne-3, and 2.0 g. of a selected co-reactant, were prepared on glass substrates in the manner described in Example III. In the case of the following co-reactants, the resulting coatings showed strong adhesion to glass after being cured 2 hrs. at ca. 150°C.: n-dodecyltriethoxysilane; sodium stearate; sodium lauryl sulfate; and cetyltrimethylammonium bromide.

EXAMPLE V

Portions of a solution of 8.0 g. ethylene-vinyl acetate copolymer (Elvax 150, containing ca. 67% ethylene, 33% vinyl acetate), 2.0 g. oleic acid, and 2.0 g. 2,5-dimethyl-2,5-bis(t-butylperoxy)hexyne-3 in 80 ml. benzene were cast onto glass plates with the aid of a fixed-clearance applicator. After curing 2 hrs. under nitrogen at ca. 160°C., the coatings passed adhesive tape tests for adhesion, and exhibited water contact angles of ca. 40°. Similarly treated coatings, prepared from the ethylene-vinyl acetate copolymer along, failed the adhesive tape test and exhibited water contact angles of ca. 82°.

EXAMPLE VI

A series of coatings, each prepared from 8.0 g. ethylenevinyl acetate copolymer ("Elvax 420", containing ca. 82% ethylene and 18% vinyl acetate), 2.0 g. 2,5-dimethyl-2,5-bis-(t-butylperoxy)hexyne-3, and 2.0 g. of a selected co-reactant, were prepared on glass substrates in the manner described in Example V. In the case of the following co-reactants, the resulting coatings showed strong adhesion to glass after being cured 2 hrs. at ca. 160°C.: "dimer acid", sodium stearate, cetyltrimethylammonium bromide.

In comparison to the starting polymers, the modified polymers prepared in accordance with this invention have a number of useful properties. Such properties include increased susceptibility to environmental deterioration; increased susceptibility to microbiological attack ("biodegradability"); improved adhesion to surfaces such as metal, glass and wood; improved receptivity to dyes, inks, and coatings; improved wetting of fillers, reinforcing agents, and pigments; anti-static properties; improved emulsifiability; and improved solubility in certain solvents.

Such properties suggest a wide variety of practical applications, in such areas as coatings, adhesives, packaging films, inks, plastic cups and bottles, etc.

I claim:

1. A process for preparing chemically modified olefin homopolymers or olefin copolymers which consists of reacting about 60 to about 98% by weight of an olefin homopolymer or olefin copolymer with about 1 to about 30% by weight of a co-reactant, said co-reactant being a non-polymeric organic compound having the generalized structure R–X, where R is a saturated linear, branched or cyclic aliphatic hydrocarbon residue containing at least six carbon atoms, and X is at least one highly polar functional group selected from the group consisting of hydroxyl (—OH); carboxyl (—COOH); amide (—CONH$_2$); disubstituted amide (—CONR$_1$R$_2$), where R$_1$ and R$_2$ are the same or different lower alkyls containing one to four carbons; amino (—NH$_2$); disubstituted amino (—NR$_1$R$_2$), where R$_1$ and R$_2$ are the same or different lower alkyls containing one to four carbons; trialkoxysilyl

where R$_1$, R$_2$ and R$_3$ are lower alkyls containing one to four carbons, dihydrogen phosphate (—OPO$_3$H$_3$); carboxylate (—COO$^-$); and ammonium (—NR$_1$R$_2$R$_3$), where R$_1$, R$_2$ and R$_3$ are hydrogens or lower alkyls containing one to six carbons, said reaction being conducted in the presence of about 1% to about 20% by weight of a source capable of generating free radicals and in the presence of a stimulus selected from heat, light, oxygen, organic compound free-radical initiating reagents, and combinations thereof to cause said generation of free radicals.

2. The process of claim 1 wherein there is reacted an olefin homopolymer or olefin copolymer selected from polyethylene, polypropylene, poly(1-butene), poly(4-methyl-1-pentene), ethylene-propylene copolymers, ethylene-1-butene copolymers, ethylene-1-hexene copolymers, ethylene-vinyl acetate copolymers, ethylene-ethyl acrylate copolymers, and ethylene-acrylic acid copolymers.

3. The process of claim 2 wherein the co-reactant is a fatty acid or fatty acid amide.

4. The process of claim 2 wherein the co-reactant is selected from rosin acid, aliphatic tricarboxylic acid, or salts thereof.

5. The process of claim 2 wherein the co-reactant is a nonionic, anionic, or cationic surfactant.

6. The process of claim 1 wherein the source is an organic peroxide and the stimulus is heat.

7. The process of claim 1 wherein the source is an azo compound and the stimulus is heat.

8. The process of claim 1 wherein the source is a quinone oxime and the stimulus is heat.

9. The process of claim 1 wherein the source is a bibenzyl and the stimulus is heat.

10. The process of claim 1 wherein the source is a metallo-organic reagent selected from the group consisting of cobalt 2-ethylhexanoate, cobalt napthenate, cobalt tallate, copper naphthenate, copper phthalocyanine, copper acetylacetonate, ferric acetylacetonate, ferrous acetylacetonate, ferrous stearate, iron neodecanoate, iron tallate, manganese napthenate and manganese tallate, a hydroperoxide selected from the group consisting of tert-butyl hydroperoxide; cumene hydroperoxide; diisopropylbenzene hydroperoxide; 2,5-dimethylhexane-2,5 dihydroperoxide, p-menthane hydroperoxide, and 1,1,3,3-tetramethylbutyl hydroperoxide, or mixtures of said metallo-organic reagent and hydroperoxide and the stimulus is heat.

11. The process of claim 1 wherein a mixture of the homopolymer or co-polymer, co-reactant, and source is formed into a suitable geometric shape and the reaction conducted in situ while maintaining such geometric shape.

12. The process of claim 3 wherein said fatty acid is selected from the group consisting of capric acid, lauric acid, stearic acid, palmitic acid, myristic acid, arachidic acid, behenic acid, oleic acid, linoleic acid, linolenic acid, eleostearic acid, ricinoleic acid, erucic acid, elaidic acid, and arachidonic acid.

13. The process of claim 6 wherein said organic peroxide is selected from the group consisting of acetyl peroxide; benzoyl peroxide; p-chlorobenzoyl peroxide; 2,4-dichlorobenzoyl peroxide; ditoluoyl peroxide; decanoyl peroxide; lauroyl peroxide; isobutyryl peroxide; diisononanoyl peroxide; pelargonyl peroxide; tert-butyl peroxyacetate; tert-butyl peroxymaleic acid; tert-butyl peroxyisobutyrate; tert-butyl peroxypivalate; tert-butyl peroxybenzoate; tert-butyl peroxycrotonate; tert-butyl peroxy-(2-ethylhexanoate); 2,5-dimethyl-2,5-bis-(2-ethylhexanoylperoxy) hexane; 2,5-dimethyl-2,5-bis-(benzoylperoxy) hexane; 2,5-dimethyl-2,5-bis-(tert-butylperoxy) hexane; 2,5-dimethyl-2,5-bis-(tert-butylperoxy)-hexyne-3; di-tert-butyl diperoxyphthalate; 1,1,3,3-tetramethyl-butylperoxy-2-ethyl-hexanoate; di-tert-butyl peroxide; di-tert-amyl peroxide; tert-amyl-tert-butyl peroxide; 1,1-di-tert-butylperoxy-3,3,5-trimethyl cyclohexane; bis-(tert-butylperoxy)-diisopropylbenzene; n-butyl-4,4-bis-(tert-butylperoxy)valerate; dicumyl peroxide; acetyl acetone peroxide; methyl ethyl ketone peroxide; cyclohexanone peroxide; tert-butylperoxy isopropyl carbonate; 2,2-bis-(tert-butylperoxy)butane; di-(2-ethylhexyl)peroxydicarbonate; and bis-(4-tert-butylcyclohexyl)peroxydicarbonate.

14. The process of claim 2 wherein said co-reactant is a long-chain alcohol, an amine or an amine oxide.

15. The process of claim 14 wherein said long-chain alcohol is selected from the group consisting of lauryl alcohol, stearyl alcohol, cetyl alcohol, and oleyl alcohol.

16. The process of claim 14 wherein said amine is selected from the group consisting of lauryl dimethyl amine, stearyl dimethyl amine and stearyl amine.

17. The process of claim 14 wherein said amine oxide is selected from the group consisting of lauryl dimethyl amine oxide, stearyl dimethyl amine oxide and cetyl dimethyl amine oxide.

18. The process of claim 5 wherein said nonionic surfactant is selected from the group consisting of monostearin, distearin, monoolein, diolein and polyethylene glycol.

19. The process of claim 5 wherein said cationic surfactant is selected from the group consisting of lauryl trimethyl ammonium chloride, lauryl pyridinium chloride, cetyl trimethyl ammonium bromide, cetyl pyridinium bromide; cetyl pyridinium bromide, cetyl pyridinium chloride, cetyl dimethyl benzyl ammonium chloride, stearyl dimethyl benzyl ammonium chloride and dilauryldimethyl ammonium bromide.

20. The process of claim 5 wherein said anionic surfactant is selected from the group consisting of sodium laurate, sodium stearate, sodium oleate, sodium lauryl sulfate, sodium dioctyl sulfosuccinate, sodium dinonyl sulfosuccinate, sodium dodecylbenzenesulfonate and lauryl acid phosphate.

21. The process of claim 4 wherein said rosin acid is selected from the group consisting of abietic acid and levopimaric acid.

22. The process of claim 4 wherein said rosin acid salt is selected from the group consisting of calcium resinate, barium resinate and sodium resinate.

23. The process of claim 4 wherein said aliphatic dicarboxylic acid is selected from the group consisting of sebacic acid and azelaic acid.

24. The process of claim 4 wherein said aliphatic dicarboxylic acid salt is sodium sebacate.

25. The process of claim 5 wherein said fatty acid amide is selected from the group consisting of oleamide; erucamide; oleic acid diethanolamide; lauric acid diethanolamide; stearic acid diethanolamide; lauric acid N,N-dimethyl amide; and stearic acid N,N-dimethyl amide.

26. The process of claim 7 wherein said azo compound is selected from the group consisting of 2-azobis-(isobutyronitrile), 2-azobis-(propionitrile), dimethyl-2-azobisiobutyrate, 1-azobis-(1-cyclohexanecarbonitrile), 2-azobis-(2-methylheptanitrile), 2-azobis-(2-methylbutyronitrile), 4-azobis-(4-cyanopentanoic acid) and azodicarbonamide.

27. The process of claim 8 wherein said quinone oxime is selected from the group consisting of p-quinone dioxime, p-dibenzoylquinone dioxime and 2,6-dichloroquinone chlorimide.

28. The process of claim 9 wherein said dibenzyl is selected from the group consisting of $\alpha,\alpha'$-dimethoxy-$\alpha,\alpha'$-diphenylbibenzyl; $\alpha,\alpha'$-diphenyl-$\alpha$-methoxybibenzyl; $\alpha,\alpha'$-dimethoxy-$\alpha,\alpha'$-dimethylbibenzyl; and $\alpha,\alpha'$-dimethoxybibenzyl.

29. A chemically modified olefin homopolymer or olefin copolymer produced in accordance with the process of claim 1.

30. The process of claim 7 wherein the reaction is conducted in situ on a substrate.

31. The process of claim 8 wherein the reaction is conducted in situ on a substrate.

32. The process of claim 9 wherein the reaction is conducted in situ on a substrate.

33. The process of claim 10 wherein the reaction is conducted in situ on a substrate.

* * * * *